US011053830B1

(12) United States Patent
Hornback

(10) Patent No.: US 11,053,830 B1
(45) Date of Patent: Jul. 6, 2021

(54) MIXER FOR NOX SENSOR

(71) Applicant: Faurecia Emissions Control Technologies USA, LLC, Columbus, IN (US)

(72) Inventor: Jerome Hornback, Indianapolis, IN (US)

(73) Assignee: Faurecia Emissions Control Technologies USA, LLC, Columbus, IN (US)

(*) Notice: Subject to any disclaimer, the term of this patent is extended or adjusted under 35 U.S.C. 154(b) by 0 days.

(21) Appl. No.: 16/715,159

(22) Filed: Dec. 16, 2019

(51) Int. Cl.
| | |
|---|---|
| *F01N 3/08* | (2006.01) |
| *F01N 3/20* | (2006.01) |
| *F01N 13/08* | (2010.01) |
| *B01F 5/04* | (2006.01) |
| *B01D 53/94* | (2006.01) |
| *B01F 5/06* | (2006.01) |

(52) U.S. Cl.
CPC ....... *F01N 3/2066* (2013.01); *B01D 53/9431* (2013.01); *B01D 53/9495* (2013.01); *B01F 5/0403* (2013.01); *B01F 5/0606* (2013.01); *F01N 3/0842* (2013.01); *F01N 13/08* (2013.01); *F01N 2610/02* (2013.01); *F01N 2610/1453* (2013.01)

(58) Field of Classification Search
CPC ............ B01D 53/9431; B01D 53/9495; B01F 5/0403; B01F 5/0606; F01N 3/2066; F01N 3/0842; F01N 3/2892; F01N 13/08; F01N 13/008; F01N 2610/02; F01N 2610/1453

USPC ........................... 60/274, 277, 295, 301, 317
See application file for complete search history.

(56) References Cited

U.S. PATENT DOCUMENTS

| | | | |
|---|---|---|---|
| 8,935,918 B2 | 1/2015 | Vosz | |
| 8,999,276 B1 | 4/2015 | Bui | |
| 9,765,674 B2* | 9/2017 | Khaled | B01D 53/9418 |
| 2010/0281851 A1* | 11/2010 | Roach | F01N 3/2066 60/274 |
| 2013/0269325 A1* | 10/2013 | Hadden | B01F 5/0689 60/297 |
| 2017/0067387 A1* | 3/2017 | Khaled | F01N 9/00 |
| 2018/0010508 A1* | 1/2018 | Khaled | B01D 53/9418 |
| 2018/0363534 A1* | 12/2018 | Khaled | F01N 13/0093 |
| 2020/0173331 A1* | 6/2020 | Bunkus | F01N 3/2033 |

FOREIGN PATENT DOCUMENTS

| | | | |
|---|---|---|---|
| CN | 104179555 | * | 12/2014 |
| WO | 2016039720 A1 | | 3/2016 |

OTHER PUBLICATIONS

Machine translation CN 104179555 (Year: 2020).*

* cited by examiner

*Primary Examiner* — Audrey K Bradley
*Assistant Examiner* — Dapinder Singh
(74) *Attorney, Agent, or Firm* — Carlson, Gaskey & Olds, P.C.

(57) ABSTRACT

A vehicle exhaust system includes an exhaust gas aftertreatment component and an exhaust duct positioned downstream of the exhaust gas aftertreatment component. The exhaust duct defines an internal cavity and a mixer is positioned within the internal cavity. A sensor is configured to sample exhaust gas downstream of the mixer.

28 Claims, 1 Drawing Sheet

MIXER FOR NOX SENSOR

TECHNICAL FIELD

This disclosure relates to a mixer for a NOx sensor in a vehicle exhaust system.

BACKGROUND

An exhaust system conducts hot exhaust gases generated by an engine through various exhaust components to reduce emissions and control noise. In one traditional configuration, the exhaust system includes an injection system that injects a NOx reduction fluid upstream of a selective catalytic reduction (SCR) catalyst that breaks down NOx into nitrogen and water vapor. The system also includes a NOx sensor that measures a quantity of NOx in the exhaust gas exiting the SCR catalyst. Sampling of the gas stream by the sensor should be as accurate as possible.

SUMMARY

In one exemplary embodiment, vehicle exhaust system includes an exhaust gas aftertreatment component and an exhaust duct positioned downstream of the exhaust gas aftertreatment component. The exhaust duct defines an internal cavity and a mixer is positioned within the internal cavity. A sensor is configured to sample exhaust gas downstream of the mixer.

In a further embodiment of the above, the system includes an additional mixer positioned upstream of the exhaust gas aftertreatment component.

In a further embodiment of any of the above, the additional mixer includes a mixer housing with an opening configured to receive a doser that injects a fluid into the mixer housing to mix with the exhaust gas.

In a further embodiment of any of the above, the mixer includes a plurality of mixer vanes that are circumferentially spaced about a center axis of the exhaust duct.

In a further embodiment of any of the above, the mixer includes an upstream mixer portion defined by a first outermost dimension and a downstream mixer portion defined by a second outermost dimension that is less than the first outermost dimension.

In a further embodiment of any of the above, the upstream mixer portion includes a first plurality of mixer vanes that are circumferentially spaced about a center axis of the exhaust duct, and the downstream mixer portion includes a second plurality of mixer vanes that are circumferentially spaced about the center axis.

In a further embodiment of any of the above, the exhaust gas aftertreatment component comprises a SCR component.

In a further embodiment of any of the above, the sensor comprises a NOx sensor.

In another exemplary embodiment, a vehicle exhaust system includes a SCR component, a first mixer positioned upstream of the SCR component, and an exhaust duct positioned downstream of the SCR component. The exhaust duct defines an internal cavity and a second mixer is positioned within the internal cavity. A NOx sensor is configured to sample exhaust gas downstream of the second mixer.

In a further embodiment of any of the above, the first mixer includes a mixer housing with an opening configured to receive a doser that injects a fluid into the mixer housing to mix with the exhaust gas.

In a further embodiment of any of the above, the exhaust duct defines a center axis and has a first cross-section extending perpendicular to the center axis, and wherein the second mixer extends entirely across the first cross-section.

In a further embodiment of any of the above, the exhaust duct has an inlet portion defining a second cross-section extending perpendicular to the center axis, and wherein the second cross-section is less than the first cross-section.

In a further embodiment of any of the above, the exhaust duct defines a center axis, and wherein the mixer includes an upstream mixer portion having a first rim defined by a first outermost dimension and a downstream mixer portion having a second rim defined by a second outermost dimension that is less than the first outermost dimension, and wherein the first and second rims are axially spaced apart from each other.

In a further embodiment of any of the above, the upstream mixer portion includes a first plurality of mixer vanes that are circumferentially spaced about a center axis of the exhaust duct, and the downstream mixer portion includes a second plurality of mixer vanes that are circumferentially spaced about the center axis.

In another exemplary embodiment, a method includes positioning a first mixer upstream of a SCR component; positioning an exhaust duct downstream of the SCR component, the exhaust duct defining an internal cavity; positioning a second mixer within the internal cavity; and configuring a NOx sensor to sample exhaust gas downstream of the second mixer.

In a further embodiment of the above, the method includes forming the exhaust duct to have a main cross-section that is greater than an inlet cross-section, and positioning the second mixer and the NOx sensor in the main cross-section.

These and other features of the present disclosure can be best understood from the following specification and drawings, the following of which is a brief description.

DETAILED DESCRIPTION

Figure 1:
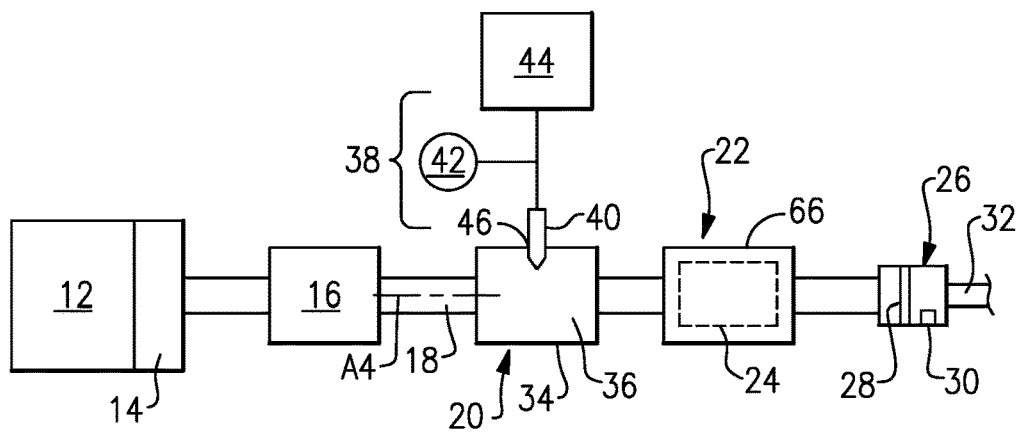
FIG. 1 is a schematic view of a vehicle exhaust system with a mixer incorporating the subject invention.

As shown in FIG. 1, a vehicle exhaust system 10 includes an engine 12 that generates exhaust gases that are conveyed through an exhaust manifold 14 to various downstream exhaust components. In one example configuration, a turbocharger 16 is located downstream of the exhaust manifold 14 and includes a turbocharger outlet pipe 18. A first mixer 20 is positioned downstream of the turbocharger outlet pipe 18. Additional exhaust components may be positioned between the turbocharger outlet pipe 18 and the first mixer 20.

An exhaust gas aftertreatment component 22 having an exhaust after-treatment substrate 24 is positioned immediately downstream of the mixer 20. The mixer 20 is used to direct a mixture of a reducing agent and engine exhaust gases into the substrate 24, such as a selective catalytic reduction (SCR) substrate 24, for example. Downstream of the substrate 24 there is an exhaust duct 26 that includes a second mixer 28 and a sensor 30. Downstream of the exhaust duct 26 there may be various additional downstream exhaust components such as pipes, mufflers, resonators, etc. These downstream exhaust components then direct the exhaust gases to an outlet to atmosphere via a tailpipe 32. The components can be mounted in various different configurations and combinations dependent upon the type of application and available packaging space.

The first mixer 20 includes an outer housing 34 that has an internal open cavity 36 that defines an exhaust gas flow path. An injection system 38 includes an injector or doser 40 that delivers a reducing agent, e.g., a NOx reduction fluid such as urea, NH3 carbonate, or any reduction gas or liquid that is a solution of urea and water, into the internal cavity 36 and upstream of the substrate 24. The operation of the doser is known, and any type of injector or doser can be used. The first mixer 20 mixes engine exhaust gases with the injected reducing agent. The doser 40 is mounted to an outer peripheral surface of the outer housing 34. The outer housing 34 includes an opening 46 that receives the doser 40. The doser 40 receives the reducing agent from a fluid supply 42 and a controller 44 controls injection of the fluid as known.

Figure 2:
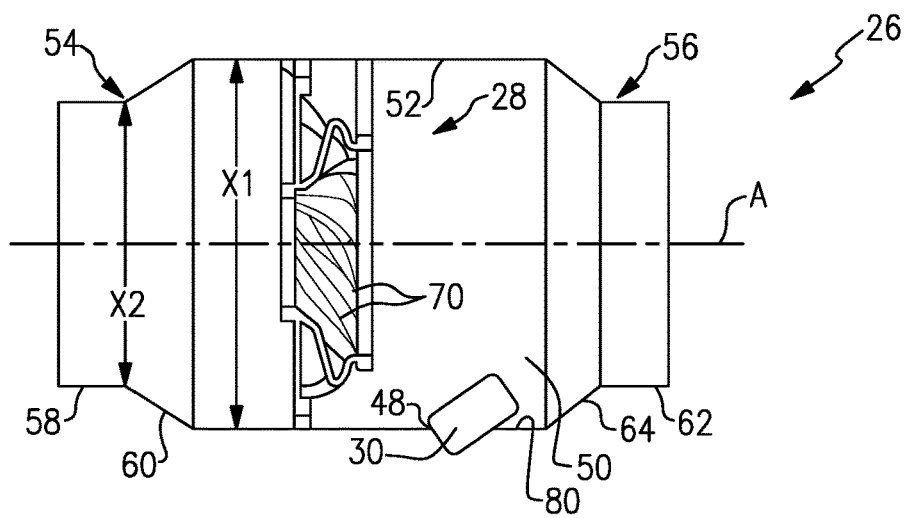
FIG. 2 is a side view of the exhaust duct of FIG. 1 with the mixer and sensor.

As shown in FIG. 2, the exhaust duct 26 defines an internal cavity 50 and the second mixer 28 is positioned within the internal cavity 50 along with the sensor 30. In one example, the second mixer 28 and the sensor 30 are downstream of the SCR substrate 24 that breaks down NOx into nitrogen and water vapor. In one example, the sensor 30 comprises a NOx sensor that is configured to sample a quantity of NOx in the exhaust gas downstream of the SCR substrate 24 and the second mixer 28.

In one example, the exhaust duct includes a center portion 52, an inlet portion 54, and an outlet portion 56. The center portion 52 has a larger diameter as compared to the inlet 54 and outlet 56 portions. The inlet portion 54 includes an inlet pipe 58 and an inlet cone 60 that connects the inlet pipe 58 to the center portion 52. The inlet cone 60 has a diameter that continuously increases from a downstream end of the inlet pipe 54 to an upstream end of the center portion 52. The outlet portion 56 includes an outlet pipe 62 and an outlet cone 64 that connects the outlet pipe 62 to the center portion 52. The outlet cone 64 has a diameter that continuously decreases from a downstream end of the center portion 52 to an upstream end of the outlet pipe 62. The inlet pipe 58 connects to an outlet from a housing 66 (FIG. 1) of the exhaust gas aftertreatment component 22 with the SCR substrate 24. Thus, the center portion 52 comprises an enlarged chamber portion that receives the second mixer 28 and sensor 30. The enlarged chamber offsets any back pressure impact due to the inclusion of the second mixer 28.

In one example, the center portion 52 of the exhaust duct 26 includes an opening 48 that receives the sensor 30. The position of the opening 48 and location/angle of the sensor 30 can be varied as needed such that the sensor 30 does ingest water vapor. In one example, the center portion 52 is free from other openings such that the opening 48 is the only opening in the exhaust duct 26, and the second mixer 28 and sensor 30 are the only components positioned within the exhaust duct.

The exhaust duct 26 defines a center axis A and has a first cross-section X1 that extends perpendicular to the center axis A. In one example, the second mixer 28 extends entirely across the first cross-section X1. The inlet portion 54 defines a second cross-section X2 that extends perpendicular to the center axis A. In one example, the second cross-section X2 is less than the first cross-section X1.

Figure 3A:
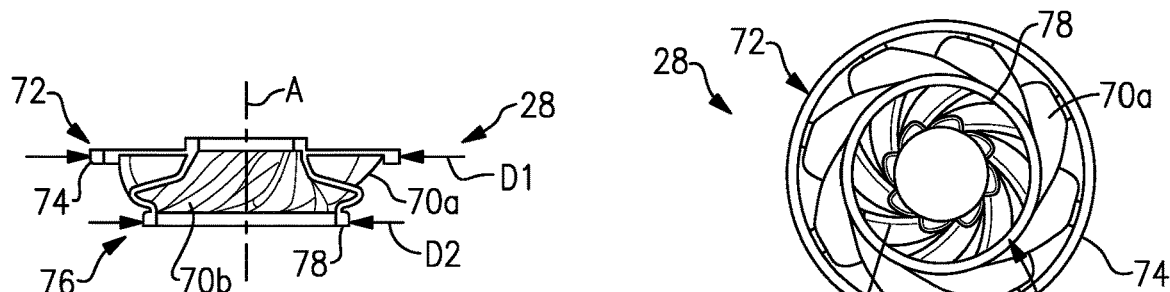
FIG. 3A is a side view of the mixer of FIG. 2.
Figure 3B:
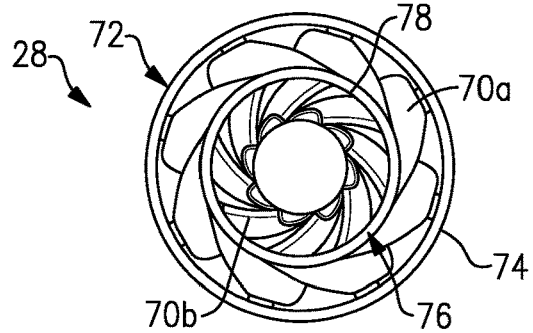
FIG. 3B is an end view of the mixer of FIG. 3A.
Figure 3C:
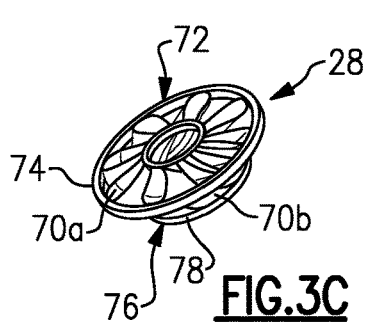
FIG. 3C is a perspective view of the mixer of FIG. 3A.

In one example, the second mixer 28 includes a plurality of mixer vanes 70 that are circumferentially spaced about the center axis A of the exhaust duct 26. The second mixer 28 is shown in greater detail in FIGS. 3A-3C. In one example, the mixer 28 includes an upstream mixer portion 72 having a first rim 74 defined by a first outermost dimension or diameter D1 and a downstream mixer portion 76 having a second rim 78 defined by a second outermost dimension or diameter D2 that is less than the first outermost diameter D1. The first 74 and second 78 rims are axially spaced apart from each other in a direction along the axis A.

In one example, the upstream mixer portion 72 includes a first plurality of mixer vanes 70a that are circumferentially spaced about the center axis A and the downstream mixer portion 76 includes a second plurality of mixer vanes 70b that are circumferentially spaced about the center axis A. The vanes 70a, 70b are configured to extend at angles relative to the axis A as best shown in FIG. 2. The vanes 70a, 70b are configured to combine multiple locations of the cross-section of the exhaust stream and force any sector to converge with other sectors that normally would not be combined with each other. This is done by changing velocity and pressure zones of each sector, which is controlled by the length and cross section of each vane, located either adjacent to, symmetrically opposite of each other, or randomized. An infinite number of geometry combinations can be created to control these parameters and one such geometry example is disclosed in FIGS. 3A-3C.

The sensor 30 is positioned downstream of the second mixer 28 and is positioned adjacent an inner surface 80 of the center portion 52 of the exhaust duct 26. The sensor 30 is orientated such that the sensor 30 cannot ingest any water vapor that is part of the exhaust gas stream exiting the substrate 24. The second mixer 28 mixes the exhaust gas stream exiting the substrate 24 to provide a more homogeneous flow. In one example, the sensor 30 samples the exhaust gas to measure a NOx quantity and then communicates this data to the controller 44.

The subject disclosure provides for an enlarged chamber downstream of an aftertreatment substrate that includes a mixer and a sensor. The mixer thoroughly mixes the exhaust gas exiting the substrate before the mixture is sampled be the sensor. This configuration provides for an increase in accuracy of exhaust gas sampling, e.g. NOx sampling, to allow the sensor to detect an average concentration of NOx ppm as opposed to a concentrated or diluted portion of the stream.

The second mixer 28 can be cast and inserted as a single cartridge to provide a low cost manufacturing alternative to increase sampling accuracy. Further, there is the potential for an improved uniformity index (UI) as the entire cross-section of the exhaust gas flow is mixed prior to being sensed by the sensor 30. The sensor 30 and second mixer 28 can be placed in locations independent of each other to provide for more packaging options.

Although embodiments have been disclosed, a worker of ordinary skill in this art would recognize that certain modifications would come within the scope of this disclosure. For that reason, the following claims should be studied to determine the true scope and content of this disclosure.

The invention claimed is:
1. A vehicle exhaust system comprising:
an exhaust gas aftertreatment component;
an exhaust duct positioned downstream of the exhaust gas aftertreatment component, the exhaust duct having an enlarged portion defining an internal cavity;
a mixer positioned within the internal cavity; and a sensor positioned in the enlarged portion and configured to sample exhaust gas downstream of the mixer.

2. The vehicle exhaust system according to claim 1, including an additional mixer positioned upstream of the exhaust gas aftertreatment component.

3. The vehicle exhaust system according to claim 2, wherein the additional mixer includes a mixer housing with an opening configured to receive a doser that injects a fluid into the mixer housing to mix with the exhaust gas.

4. The vehicle exhaust system according to claim 1, wherein the exhaust duct defines a center axis and has a first cross-section in the enlarged portion extending perpendicular to the center axis, and wherein the mixer extends entirely across the first cross-section.

5. The vehicle exhaust system according to claim 4, wherein the exhaust duct has an inlet portion connected to an upstream end of the enlarged portion and an outlet portion connected to a downstream end of the enlarged portion, the inlet portion defining a second cross-section extending perpendicular to the center axis, and wherein the second cross-section is less than the first cross-section, and the outlet portion defining a third cross-section extending perpendicular to the center axis, and wherein the third cross-section is less than the first cross-section.

6. The vehicle exhaust system according to claim 1, wherein the mixer includes a plurality of mixer vanes that are circumferentially spaced about a center axis of the exhaust duct.

7. The vehicle exhaust system according to claim 1, wherein the mixer includes an upstream mixer portion defined by a first outermost dimension and a downstream mixer portion defined by a second outermost dimension that is less than the first outermost dimension.

8. The vehicle exhaust system according to claim 7, wherein the upstream mixer portion includes a first rim that defines the first outermost dimension and the downstream mixer portion includes a second rim that defines the second outermost dimension, and wherein the first and second rims are axially spaced apart from each other.

9. The vehicle exhaust system according to claim 8, wherein the upstream mixer portion includes a first plurality of mixer vanes that are circumferentially spaced about a center axis of the exhaust duct, and the downstream mixer portion includes a second plurality of mixer vanes that are circumferentially spaced about the center axis.

10. The vehicle exhaust system according to claim 1, wherein the exhaust gas aftertreatment component comprises a SCR component.

11. The vehicle exhaust system according to claim 10, wherein the sensor comprises a NOx sensor.

12. The vehicle exhaust system according to claim 1, wherein the sensor is positioned immediately downstream of the mixer.

13. The vehicle exhaust system according to claim 1, wherein the mixer and sensor are the only components positioned within the enlarged portion.

14. The vehicle exhaust system according to claim 13, including a sensor opening formed within the enlarged portion of the exhaust duct to receive the sensor, and wherein the enlarged portion is free from other openings such that the sensor opening is the only opening in the exhaust duct.

15. A vehicle exhaust system comprising:
a SCR component;
a first mixer positioned upstream of the SCR component;
an exhaust duct positioned downstream of the SCR component, the exhaust duct having an enlarged portion defining an internal cavity;
a second mixer positioned within the internal cavity; and
a NOx sensor positioned in the enlarged portion and configured to sample exhaust gas downstream of the second mixer.

16. The vehicle exhaust system according to claim 15, wherein the first mixer includes a mixer housing with an opening configured to receive a doser that injects a fluid into the mixer housing to mix with the exhaust gas.

17. The vehicle exhaust system according to claim 15, wherein the exhaust duct defines a center axis and has a first cross-section in the enlarged portion extending perpendicular to the center axis, and wherein the second mixer extends entirely across the first cross-section.

18. The vehicle exhaust system according to claim 17, wherein the exhaust duct has an inlet portion connected to an upstream end of the enlarged portion and an outlet portion connected to a downstream end of the enlarged portion, the inlet portion defining a second cross-section extending perpendicular to the center axis, and wherein the second cross-section is less than the first cross-section, and the outlet portion defining a third cross-section extending perpendicular to the center axis, and wherein the third cross-section is less than the first cross-section.

19. The vehicle exhaust system according to claim 15, wherein the second mixer includes a plurality of mixer vanes that are circumferentially spaced about a center axis of the exhaust duct.

20. The vehicle exhaust system according to claim 15, wherein the exhaust duct defines a center axis, and wherein the second mixer includes an upstream mixer portion having a first rim defined by a first outermost dimension and a downstream mixer portion having a second rim defined by a second outermost dimension that is less than the first outermost dimension, and wherein the first and second rims are axially spaced apart from each other.

21. The vehicle exhaust system according to claim 20, wherein the upstream mixer portion includes a first plurality of mixer vanes that are circumferentially spaced about a center axis of the exhaust duct, and the downstream mixer portion includes a second plurality of mixer vanes that are circumferentially spaced about the center axis.

22. The vehicle exhaust system according to claim 15, wherein the NOx sensor is positioned immediately downstream of the second mixer.

23. The vehicle exhaust system according to claim 22, wherein the second mixer and NOx sensor are the only components positioned within the enlarged portion.

24. The vehicle exhaust system according to claim 23, including a sensor opening formed within the enlarged portion of the exhaust duct to receive the NOx sensor, and wherein the enlarged portion is free from other openings such that the sensor opening is the only opening in the exhaust duct.

25. A method comprising:
positioning a first mixer upstream of a SCR component;
positioning an exhaust duct downstream of the SCR component, the exhaust duct having an enlarged portion and defining an internal cavity;
positioning a second mixer within the internal cavity; and
positioning a NOx sensor in the enlarged portion to sample exhaust gas downstream of the second mixer.

26. The method according to claim 25, wherein the exhaust duct has an inlet portion connected to an upstream end of the enlarged portion and an outlet portion connected to a downstream end of the enlarged portion, and including forming the enlarged portion to have a main cross-section that is greater than an inlet cross-section, and greater than an outlet cross-section, and positioning the second mixer and the NOx sensor in the main cross-section.

27. The method according to claim 25, including forming a sensor opening in the enlarged portion of the exhaust duct and positioning the NOx sensor within the sensor opening immediately downstream of the second mixer.

28. The method according to claim 25, including forming a sensor opening in the enlarged portion of the exhaust duct to receive the NOx sensor, and wherein the enlarged portion is free from other openings such that the sensor opening is the only opening in the exhaust duct, and wherein the second mixer and NOx sensor are the only components positioned within the exhaust duct.

* * * * *